Jan. 24, 1928.
V. BENDIX
BRAKE CONTROL
Filed Sept. 2, 1925
1,656,939
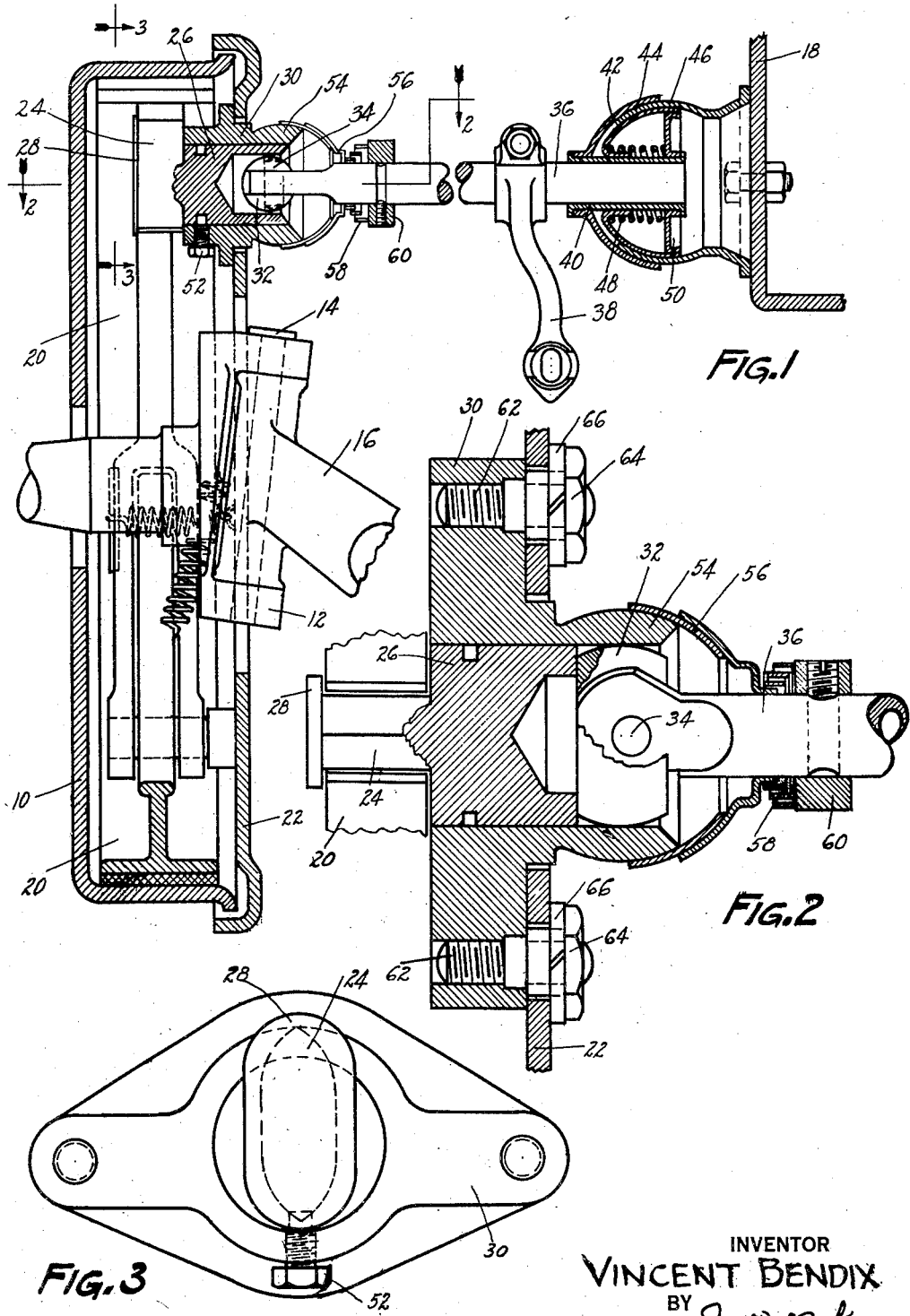
INVENTOR
VINCENT BENDIX
BY
M. W. McConkey
ATTORNEY Patented Jan. 24, 1928.

1,656,939

UNITED STATES PATENT OFFICE.

VINCENT BENDIX, OF CHICAGO, ILLINOIS, ASSIGNOR TO BENDIX BRAKE COMPANY, OF CHICAGO, ILLINOIS, A CORPORATION OF ILLINOIS.

BRAKE CONTROL.

Application filed September 2, 1925. Serial No. 54,048.

This invention relates to controls for brakes acting on front or other swivelled wheels, and is illustrated as embodied in a control including a floating operating shaft universally supported on the chassis frame at its inner end.

Various features of the invention relate to a particular arrangement of the supporting bracket for the brake-applying shaft which is universally jointed to the floating shaft in the swivelling axis of the wheel, normally holding the bracket stationary but permitting it to shift slightly to center itself when the brake is applied; and to a specific arrangement for preventing axial shifting of the brake-applying shaft; and to other novel combinations of parts and desirable particular constructions which will be apparent from the following description of one illustrative embodiment shown in the accompanying drawings, in which:

Fig. 1 is a vertical section through one front brake and its control;

Fig. 2 is a partial horizontal section on the line 2—2 of Fig. 1, showing the means permitting the bracket to shift; and Fig. 3 is a partial vertical section on the line 3—3 of Fig. 1, showing the bracket and cam in end elevation.

The particular brake illustrated includes a drum 10 rotating with a wheel (not shown) on the spindle of a knuckle 12, swivelled by a king-pin 14 at one end of a front axle 16. Axle 16, with a rear axle which is not shown, support through the usual springs the chassis frame 18. The shoes 20 of the brake are arranged inside of drum 10, and are anchored on a stationary support such as a backing plate 22.

Shoes 20 are forced against the drum by means such as a cam 24 rocked by a brake-applying camshaft 26, shown integral with the cam. The free ends of shoes 20 are confined laterally between a flange 28, on the end of the cam, and the end of shaft 26, and also, further back, a bracket 30 in which shaft 26 is journalled. Shaft 26 has a cross bore in its end receiving outwardly cylindrical connectors 32 between which a vertical pin 34 pivots the flattened end of a floating operating shaft 36, parts 32 and 34 constituting a universal joint substantially in the swivelling axis of the wheel.

Shaft 36 is rocked to apply the brake by an arm 38, and is slidably and universally supported at its inner end by a sleeve 40 carried by two stamped semispherical shells 42 and 44 arranged respectively inside and outside of a stationary semispherical support 46 bolted to the chassis frame 18. A spring 48, confined between shell 42 and a diaphragm or stop 50 held by a flange on the end of sleeve 40, serves to hold the parts together to form a universal support for shaft 36, which permits lengthwise movement of the shaft to compensate for movement of the vehicle springs.

The whole assembly, but more particularly the camshaft 26, is prevented from shifting axially to the left (Fig. 1) by a set-screw 52 threaded through a part of bracket 30 and projecting into a groove in shaft 26.

Bracket 30 has an outwardly semispherical boss 54 projecting through a relatively large opening in backing plate 22 and housing the universal joint 32—34, the housing being completed by stampings 56 held by a spring 58 confined by a stop 60 on shaft 36.

Studs 62 threaded into or integral with bracket 30 project through somewhat larger openings in the backing plate 22, and receive nuts 64 having shoulders projecting through the openings and engaging bracket 30, the nuts serving to compress to a predetermined amount spring washers 66 sleeved on the studs. By this arrangement, bracket 30 is normally clamped to backing plate 22, but when the brake is applied the reaction from cam 24 is enough to cause the bracket to shift slightly to center itself. This arrangement should not be confused with a freely floating mounting,—bracket 30 is clamped too tightly to be shifted by hand, for example. Normally the bracket centers itself the first time the brake is applied, and thereafter only shifts to compensate for uneven wear of the brake lining, etc.

While one illustrative embodiment has been described in detail, it is not my intention to limit the scope of the invention to that particular embodiment, or otherwise than by the terms of the appended claims.

I claim:

1. A control for a brake on a swivelled wheel carrying a chassis frame, comprising, in combination, an operating shaft movably and universally supported at its inner end on the frame, a brake-applying shaft connected to the operating shaft by a universal joint substantially in the swivelling axis of the wheel, a support swivelling with the wheel, a bracket in which the brake-applying shaft is journalled having studs projecting through relatively large openings in the support, yielding members sleeved on the studs, and nuts threaded on the studs and compressing the yielding members to clamp the bracket and support lightly together while permitting the bracket to shift under brake-applying pressure.

2. A control for a brake on a swivelled wheel carrying a chassis frame, comprising, in combination, an operating shaft movably and universally supported at its inner end on the frame, a brake-applying shaft connected to the operating shaft by a universal joint substantially in the swivelling axis of the wheel, a support swivelling with the wheel, a bracket in which the brake-applying shaft is journalled having studs projecting through relatively large openings in the support, and nuts threaded on the studs having shoulders passing through the openings and engaging the bracket to clamp the bracket to the support with a predetermined limited pressure permitting it to shift slightly to center itself when the brake is applied.

3. A control for a brake on a swivelled wheel carrying a chassis frame, comprising, in combination, an operating shaft movably and universally supported at its inner end on the frame, a brake-applying shaft connected to the operating shaft by a universal joint substantially in the swivelling axis of the wheel, a support swivelling with the wheel, a bracket in which the brake-applying shaft is journalled, and means clamping the bracket and support together with a predetermined limited pressure normally preventing movement of the bracket but permitting it to shift to center itself when the brake is applied.

4. A control for a brake on a swivelled wheel carrying a chassis frame, comprising, in combination, an operating shaft supported on the chassis frame at its inner end for universal and lengthwise movement, a bracket swivelling with the wheel and brake, a brake-applying cam having a cam shaft journalled in said bracket and universally jointed to the operating shaft substantially in the swivelling axis, and a setscrew carried by the bracket and projecting into a groove in the camshaft to prevent it from moving axially.

5. A brake comprising, in combination, a drum, an adjacent stationary support, a friction device engageable with the drum and arranged between the drum and support and having adjacent free ends, a cam between said free ends having a flange engaging the outer edges of said free ends to position them laterally, a bracket carried by the support, and a shaft operating the cam and journaled in the bracket and projecting beyond the cam on opposite sides flush with the face of the bracket so that the bracket and the projecting portions of the shaft will both engage the inner edges of said free ends to position them laterally.

6. An integral one-piece cam and shaft having at one end a shoe-confining flange projecting beyond the sides of the cam, and having the shaft of relatively large diameter and formed with a cylindrical cross bore across the end opposite the cam and forming an opening across its end.

7. An integral one-piece cam and shaft having at one end a shoe-confining flange projecting beyond the sides of the cam, and having the shaft of relatively large diameter and formed with a cylindrical cross bore across the end opposite the cam and forming an opening across its end, said shaft having an outer circumferential groove between the cam and the cross bore.

8. A brake control comprising, in combination, a bracket, an operating shaft journalled in the bracket and formed with a groove, and a part engaging the bracket and said groove and preventing axial movement of the shaft.

In testimony whereof I have hereunto signed my name.

VINCENT BENDIX.